Aug. 26, 1958  M. A. PICCIANO  2,849,520
CELL CONSTRUCTION

Filed July 28, 1953  2 Sheets-Sheet 1

INVENTOR.
MICHAEL A. PICCIANO
BY
Campbell, Brumbaugh, Free + Graves
his ATTORNEYS Aug. 26, 1958

M. A. PICCIANO 2,849,520

CELL CONSTRUCTION

Filed July 28, 1953

INVENTOR.
MICHAEL A. PICCIANO

BY
Campbell, Brumbaugh, Free + Graves
his ATTORNEYS.

2,849,520
CELL CONSTRUCTION

Michael A. Picciano, Maywood, N. J., assignor to Vitro Corporation of America, Verona, N. J.

Application July 28, 1953, Serial No. 370,843

10 Claims. (Cl. 136—89)

My invention relates to cell constructions for elements formed by material electrically responsive to radiation.

In a known technique for constructing cells of the aforesaid type which, for example, incorporate a light sensitive element such as a cadmium sulphide crystal as a transducer, lead-in conductors are cemented to opposite ends of the crystal; the cemented ends are covered with an electrically conductive coating; the entire arrangement is then potted in a transparent plastic body.

This technique has several inherent disadvantages. In the present state of the art, these crystals do not always have the same electrical characteristics. In this technique, the crystal is only tested after potting; if the crystal is unsatisfactory, it is less expensive to throw the potted crystal away rather than to attempt reclaiming it. In addition, the method of attaching lead-in conductors to the crystal is delicate and tedious and does not always establish suitable electrical connections.

I have invented an improved cell construction and method of cell construction which obviates these disadvantages.

Accordingly, it is an object of the present invention to provide an improved construction and method of construction for devices of the character indicated.

Another object is to provide an improved cell construction and method of construction which will permit reworking of a transducer after potting.

Still another object is to provide an improved cell construction and method of construction which will permit lead-in conductors to be readily attached and removed from a transducer without use of cement.

Yet a further object is to provide an improved construction and method of construction for devices of the character indicated which can be used both for single transducer and multi-transducer arrangements.

These and other objects of the invention will either be explained or will become apparent to those skilled in the art when this specification is studied in conjunction with the accompanying drawings wherein.

Briefly stated, my invention contemplates an improved cell construction and method of construction in which a radiation responsive element, for example a crystal, and associated lead-in conductors are potted or cast in plastic so that each conductor is positioned adjacent a corresponding end of the crystal but does not make electrical or mechanical contact therewith. Portions of the plastic are cut away to expose both crystal ends and sections of both lead-in conductors. An electrically conductive coating is then deposited on the exposed surfaces to establish electrical contact between the crystal and the conductors. The crystal can be reworked by removing the coating and additional portions of the exposed surfaces, and cutting away additional plastic material as necessary.

Figure 1:
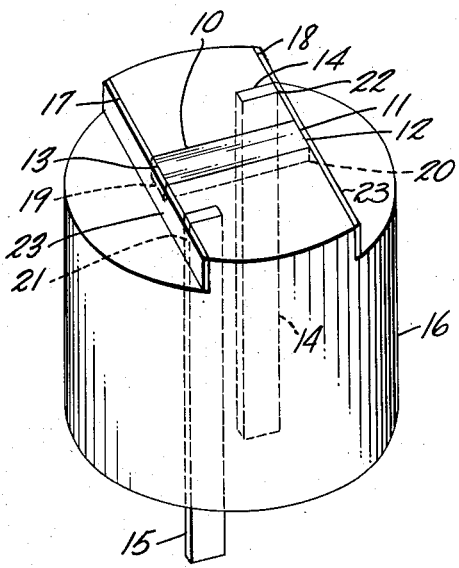
Figure 1 is an enlarged view in perspective of a single-element cell construction incorporating features of the invention.

Referring now to Figure 1, my invention is shown in application to a single-element cell which may employ a light sensitive element in the form of a single crystal 10. This crystal 10 may be of cadmium sulphide or zinc sulphide, or of the selenides of such metals. The crystal 10 may thus comprise an elongated prismatic element having an exposed face 11 with electrical-contact portions 12—13 located at the ends thereof. Radiation impinges upon the face 11 and actuates the crystal. Two ribbon shaped lead-in conductors 14—15 are placed adjacent to the corresponding crystal ends and the entire arrangement is then potted or cast in a generally cylindrical cell body 16. This body may be formed from a radiation transparent plastic, for example, a transparent insulating material known to the trade as Kelon. In this configuration, the lead-in conductors 14—15 are shown on opposite sides of the crystal 10. If desired, these conductors can be placed on the same side of the crystal.

Moreover, the lead-in conductors need not be simultaneously potted with the crystal. For example, the crystal itself may be potted, then lead-in channels may be bored into the plastic body. The lead-in conductors may then be placed in these channels and the openings may be sealed with potting material.

In either situation, portions of the potting material are cut away at 17—18 to expose both crystal end surfaces 19—20 and sectional surfaces 21—22 of the lead-in conductors which are adjacent these end surfaces, the surfaces 19—20 and 21—22 being flush with the outer surface of the cell body 16.

To establish electrical contact between the crystal and conductor surfaces, the surfaces 19—21 and 20—22 are coated with an electrically conductive coating 23 greatly exaggerated in thickness in the drawing, in the interests of clarity. This coating may be of a commercially available material such as Aquadag and be applied as a spray. Alternatively, these surfaces may be electroplated with copper or a similar metal, or other conventional techniques such as electrophoretic deposition, vacuum metalizing, or the so-called "electroless plating" may be used.

The potted crystal may be reworked by removing the coating 23, for example by grinding, and afterwards cutting away additional portions of the plastic body, crystal and lead-in conductors as necessary.

An exemplary embodiment of the invention uses a cadmium sulfide crystal 10 potted together with the conductors 14 and 15 in a cell body 16 formed of Kelon, as shown in Figure 1. The Kelon is then cut away at 17 and 18 to expose the crystal end surfaces 19 and 20 and the surfaces 21 and 22 of the lead-in conductors 14 and 15. Finally, an electrically conductive coating 23 of Aquadag is sprayed on the surfaces 19 to 22 and on the outer surfaces of the cell body 16 flush therewith. The completed structure may be inserted in a circuit requiring an element, the resistance of which varies with the amount of light impinging thereon, since cadmium sulfide crystal is a photoconductive substance.

Figure 2:
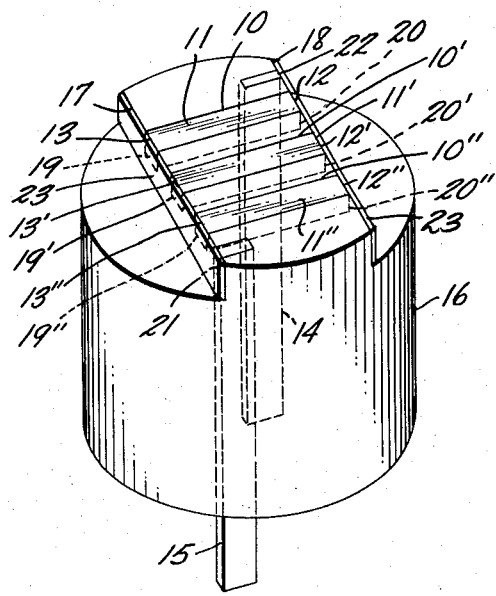
Figure 2 shows a like view of a multi-element cell construction incorporating features of the invention.

Referring now to Figure 2, my invention as shown in application to a multi-element cell which may employ three radiation responsive transducers in the form of three crystals 10, 10' and 10". All other elements in Figure 2 are identical with those shown in Figure 1 and are identified by the same numbers.

These crystals have exposed faces identified as 11, 11' and 11" respectively and have electrical contact portions 12—13, 12'—13' and 12"—13".

Portions of the potting material are cut away at 17—18 to expose crystal end surfaces 19—20, 19'—20' and 19"—20", and the sectional surfaces 21—22 of the lead-in conductors which are adjacent these surfaces.

It will be apparent when surfaces 19—19', 19"—21 and 20—20'—20"—22 are coated with the electrically conductive coating 23, the three cells are connected in parallel. As explained in connection with Figure 1, the thickness of the coating 23 is greatly exaggerated in the interests of clarity. It will likewise be apparent that if additional lead-in conductors are inserted in the plastic body 16, it is possible to obtain any desired series-parallel arrangement of crystals as, for example, a balanced bridge arrangement where the series connection of two crystals shunts another like series connection of two additional crystals.

Figure 3:
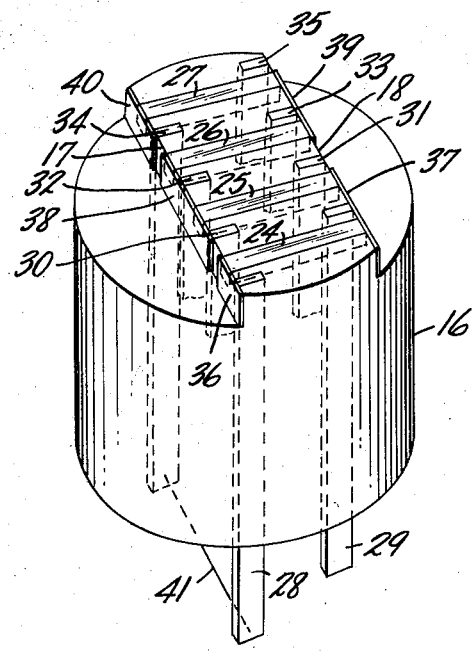
Figure 3 is a view in perspective illustrating a modified multi-element cell construction in accordance with the invention.

More particularly, in Figure 3 the cell body 16 is cast with four cadmium sulfide crystals 24 to 27 each associated with one pair of lead-in conductors 28 to 35, respectively. Portions of the potting material are cut away to expose the crystal ends and the lead-in conductors. To form the above referred to series-parallel or bridge arrangement, shown schematically in Figure 4, a conductive coating 36 connects the conductor 28 to one end of the crystal 24, a conductive coating 37 joins the ends of the crystals 24 and 25, a conductive coating 38 joins the ends of the crystals 25 and 26, a conductive coating 39 joins the ends of the crystals 26 and 27, a conductive coating 40 connects the crystal 27 to the lead-in conductor 34, and a conductor 41 connects the lead-in conductors 34 and 28.

Figure 4:
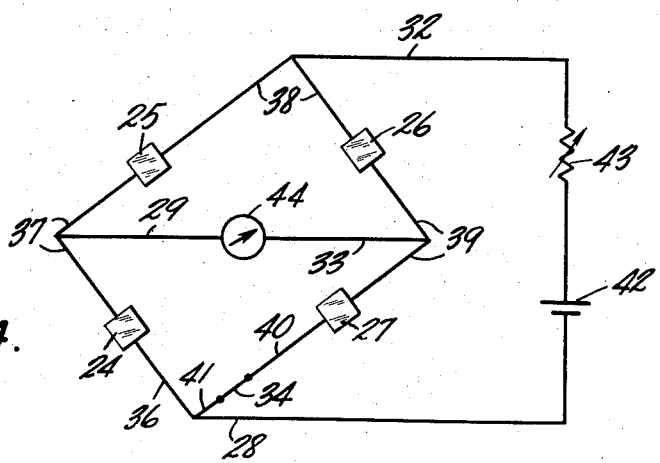
Figure 4 is a schematic circuit diagram showing one use of the cell illustrated in Figure 3.

The crystals may be used in a bridge circuit, as shown in Figure 4, by energizing the lead-in conductors 28 and 32 by a D.-C. source 42 through a variable resistor 43. The unbalance of the bridge is indicated by a meter 44 connected to the lead-in conductors 29 and 33.

It will be seen that I have disclosed an improved cell construction and method of construction adaptable for single cell and multi-cell arrangement which feature ease of conductor attachment and removal and which permits any transducer of the character indicated to be easily reworked after potting.

While I have described the invention for the preferred forms shown, it will be understood that modifications may be made within the scope of the invention as defined in the claims which follow.

I claim:

1. A photosensitive cell comprising a transparent plastic body having a generally cylindrical shape; an elongated prismatic element formed from a crystal electrically responsive to radiation impinging on a selected crystal face and imbedded in said body; first and second ribbon shaped parallel conductors positioned adjacent opposite ends of said crystal and imbedded in said body, said conductors being physically separated from said crystal, the long axis of said conductors being perpendicular to said crystal face, the narrow edge of each conductor adjacent the external surface of said body lying in a plane with the end surface of the corresponding end of said crystal, portions of said body being cut away to form body surfaces respectively flush with the coplanar crystal end surfaces and conductor narrow edges; and conductive layers disposed on the body surfaces respectively electrically joining the crystal end surfaces and the corresponding conductor narrow edges.

2. A cell as set forth in claim 1 wherein said conductors are located on opposite sides of the crystal.

3. A cell as set forth in claim 1 wherein said conductors are located on the same side of the crystal.

4. A photosensitive cell comprising a transparent plastic body having a generally cylindrical shape; an array including a plurality of parallel equally spaced elongated prismatic elements each formed from a crystal, said crystals being imbedded in said body, each crystal being electrically responsive to radiation impinging on a selected crystal face, the selected faces of said plurality of crystals lying in the same plane; first and second ribbon shaped parallel conductors imbedded in said body, the long axis of said conductors being perpendicular to said plane, said first conductor being positioned adjacent a first end of the first crystal in said array and physically separated therefrom, said second conductor being positioned adjacent the second and opposite end of the last crystal in said array and physically separated therefrom, a first portion of said body being cut away to expose a section of said first conductor and the first end surfaces of said crystals, a second portion of said body being cut away to expose a section of said second conductor and the second end surfaces of said crystals; a first electrically conductive coating covering said first conductor section and said first end surfaces; and a second electrically conductive coating covering said second conductor section and said second end surfaces.

5. A method of imbedding in a plastic container an elongated element formed from a crystal and two conductors which are positioned adjacent opposite ends of the crystal and physically separated therefrom comprising the steps of casting said crystal and said conductors in a body of plastic material and removing segmental portions of said material from said body to expose the end surfaces of said crystal and an area of each conductor.

6. The method of claim 5 further including the step of applying an electrically conductive coating to the body, each end surface and the area of its corresponding conductor for electrically connecting corresponding end surfaces and conductors.

7. The method of assembling a cell comprising the steps of casting an elongated element formed from light sensitive material in a body of insulating material, boring a hole adjacent and physically separated from each end of said element through said body, inserting a conductor in each hole, sealing said conductors in said body, cutting away segmental portions of said body to expose the end surfaces of said element and areas of said conductors, and applying an electrically conductive coating to the body, corresponding end surfaces and areas of the corresponding conductors for electrically connecting said end surfaces and their respective conductors.

8. A mounting for an element formed from a photosensitive crystal comprising an insulator body having the crystal imbedded therein, a first conductor imbedded in the insulator body and having a portion positioned adjacent to and physically separated from a first surface of the crystal, a second conductor imbedded in the insulator body and having a portion positioned adjacent to and physically separated from a second surface of the crystal remote from said first surface, the first crystal surface and a surface of the first conductor portion being flush with the outer surface of the insulator body, the second crystal surface and a surface of the second conductor portion being flush with the outer surface of the insulator body, a first conductive layer disposed on the outer surface of the body electrically joining the first crystal surface and the first conductor portion surface, and a second conductive layer disposed on the outer surface of the body electrically joining the second crystal surface and the second conductor portion surface.

9. A mounting as defined in claim 8 in which the first crystal surface and the first conductor portion surface are disposed in one plane and the second crystal surface and the second conductor portion surface are disposed in another plane.

10. A mounting as defined in claim 9 in which a major surface of the crystal is flush with the outer surface of the insulator body and the first and second crystal surfaces comprise ends thereof.

References Cited in the file of this patent

UNITED STATES PATENTS

| | | |
|---|---|---|
| 1,316,350 | Case | Sept. 16, 1919 |
| 1,904,139 | Henkel et al. | Apr. 18, 1933 |
| 2,114,591 | Clark | Apr. 19, 1938 |
| 2,487,865 | Glassy | Nov. 15, 1949 |
| 2,586,609 | Burke | Feb. 19, 1952 |
| 2,622,117 | Benzer | Dec. 16, 1952 |
| 2,650,258 | Pantchechnifoff | Aug. 25, 1953 |
| 2,674,677 | Anderson et al. | Apr. 6, 1954 |